(12) United States Patent
Urade et al.

(10) Patent No.: US 10,647,924 B2
(45) Date of Patent: May 12, 2020

(54) BIOMASS CONVERSION PROCESS

(71) Applicant: SHELL OIL COMPANY, Houston, TX (US)

(72) Inventors: Vikrant Nanasaheb Urade, Bengaluru (IN); Laxmi Narasimhan Chilkoor Soundararajan, Bengaluru (IN); Alan Anthony Del Paggio, Spring, TX (US); Srikant Gopal, Chennai (IN); Prakhar Arora, Rajasthan (IN)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/322,301

(22) PCT Filed: Aug. 2, 2017

(86) PCT No.: PCT/EP2017/069577
§ 371 (c)(1),
(2) Date: Jan. 31, 2019

(87) PCT Pub. No.: WO2018/024796
PCT Pub. Date: Feb. 8, 2018

(65) Prior Publication Data
US 2019/0169508 A1 Jun. 6, 2019

(30) Foreign Application Priority Data

Aug. 4, 2016 (IN) .............................. 201641026608

(51) Int. Cl.
*C10G 3/00* (2006.01)
*C10G 1/00* (2006.01)
*C10G 1/06* (2006.01)
*C10G 1/10* (2006.01)

(52) U.S. Cl.
CPC ............... *C10G 3/50* (2013.01); *C10G 1/002* (2013.01); *C10G 1/06* (2013.01); *C10G 1/10* (2013.01)

(58) Field of Classification Search
None
See application file for complete search history.

(56) References Cited

U.S. PATENT DOCUMENTS

| 2015/0094503 A1 | 4/2015 | Del Paggio et al. |
| 2016/0002540 A1* | 1/2016 | Felix ...................... C10G 1/002 585/242 |

(Continued)

FOREIGN PATENT DOCUMENTS

| WO | 2010117437 A1 | 10/2010 |
| WO | 2015114008 A1 | 8/2015 |

(Continued)

OTHER PUBLICATIONS

International Search Report and Written Opinion received for PCT Patent Application No. PCT/EP2017/069577, dated Nov. 14, 2017, 8 pages.

(Continued)

*Primary Examiner* — Ali Z Fadhel (57) ABSTRACT

The present invention provides a process for producing liquid hydrocarbon products from a feedstock comprising at least one of a solid biomass-containing feedstock and a solid biomass-derived feedstock and in the range of from 50 to 15000 ppmw of chlorides, said process comprising the steps of: a) incorporating a chloride trap material into said feedstock to provide a combined feedstock/chloride trap material; b) densifying the combined feedstock/chloride trap material to form densified feed in the form of pellets or briquettes; c) contacting said densified feed with a hydropyrolysis catalyst composition and molecular hydrogen in a hydropyrolysis reactor vessel at a temperature in the range (Continued)

of from 350 to 600° C. and a pressure in the range of from 0.50 to 7.50 MPa to produce a product stream comprising a deoxygenated hydrocarbon product, $H_2O$, $H_2$, $CO_2$, CO, $C_1$—$C_3$ gases, char and catalyst fines; and d) removing all or a portion of said char and catalyst fines from said product stream.

10 Claims, 5 Drawing Sheets

(56)  References Cited

U.S. PATENT DOCUMENTS

| | | | |
|---|---|---|---|
| 2016/0068758 A1* | 3/2016 | Linck | C10G 1/002 585/242 |
| 2018/0245000 A1 | 8/2018 | Urade et al. | |

FOREIGN PATENT DOCUMENTS

| | | |
|---|---|---|
| WO | 2016001134 A1 | 1/2016 |
| WO | 2016001163 A1 | 1/2016 |
| WO | 2016001170 A1 | 1/2016 |
| WO | 2017202837 A1 | 11/2017 |

OTHER PUBLICATIONS

Fontana et al., "Municipal waste pyrolysis (2): Chlorine Capture by Addition of Calcium and Sodium-Based Sorbents", Erdöl—Erdgas—Kohle, vol. 117, Issue No. 2001, 1999, pp. 1-19.

* cited by examiner

BIOMASS CONVERSION PROCESS

CROSS REFERENCE TO RELATED APPLICATIONS

This is a national stage application of International Application No. PCT/EP2017/069577, filed Aug. 2, 2017, which claims benefit of priority to Indian Patent Application No. 201641026608, filed Aug. 4, 2016.

FIELD OF THE INVENTION

The invention relates to an improved process for converting a biomass-containing or biomass-derived feedstock into a liquid hydrocarbon material suitable for use as a fuel or as a blending component in a fuel.

BACKGROUND OF THE INVENTION

With increasing demand for liquid transportation fuels, decreasing reserves of 'easy oil' (crude petroleum oil that can be accessed and recovered easily) and increasing constraints on the carbon footprints of such fuels, it is becoming increasingly important to develop routes to produce liquid transportation fuels from alternative sources in an efficient manner.

Biomass offers a source of renewable carbon and refers to biological material derived from living or recently deceased organisms and includes lignocellulosic materials (e.g., wood), aquatic materials (e.g., algae, aquatic plants, and seaweed) and animal by-products and wastes (e.g., offal, fats, and sewage sludge). Liquid transportation fuels produced from biomass are sometimes referred to as biofuels. Therefore, when using such biofuels, it may be possible to achieve more sustainable $CO_2$ emissions over petroleum-derived fuels.

However, in the conventional pyrolysis of biomass, typically fast pyrolysis carried out in an inert atmosphere, a dense, acidic, reactive liquid bio-oil product is obtained, which contains water, oils and char formed during the process. The use of bio-oils produced via conventional pyrolysis is, therefore, subject to several drawbacks. These include increased chemical reactivity, water miscibility, high oxygen content and low heating value of the product. Often these products are difficult to upgrade to fungible liquid hydrocarbon fuels.

An efficient method for processing biomass into high quality liquid fuels is described in WO2010117437, in the name of Gas Technology Institute. The method described in WO2010117437 for the conversion of biomass into liquid hydrocarbon fuels uses catalytic hydropyrolysis and hydroconversion steps. While not being limited to any particular catalyst, exemplary catalysts for use in such processes include sulfided catalysts containing nickel, molybdenum, cobalt or mixtures thereof as active metal(s).

Biomass-containing or biomass-derived feedstocks, such as feedstocks containing municipal solid waste, waste plastics, food waste and feedstocks containing lignocellulose (e.g. woody biomass, agricultural residues, forestry residues, residues from the wood products and pulp & paper industries) are important feedstocks for biomass to fuel processes due to their availability on a large scale. Some of these materials, in particular municipal solid waste containing waste paper, cardboard, polyvinyl chloride plastic or food waste, and agricultural residues such as corn stover, rice husk, marine and brackish water plants or microorganisms such as marine microalgae or macroalgae contain high levels of impurities, such as chlorides, which can have a detrimental effect on the overall process.

Chlorides contained within biomass-containing or biomass-derived feedstocks may be liberated during a high temperature hydropyrolysis step (for example at temperatures in excess of 400° C.). Liberated chlorides may also react with any hydrogen present to produce vapour-phase hydrogen chloride.

The presence of vapour phase chlorides may cause corrosion in the reactor and other process equipment. Process equipment containing aqueous phase product is particularly susceptible to corrosion, as chlorides may preferentially dissolve in water and contribute to corrosion of the heat exchangers, gas-liquid separators, and other process equipment handling the aqueous phase. Further, hydrogen chloride dissolves in water to produce a low-pH aqueous phase containing hydrochloric acid. Typical materials used for process equipment in high-temperature hydrogen-handling services, such as austenitic stainless steels, are highly susceptible to chloride attack.

Vapour-phase chlorides may also act as poisons for catalysts used in hydropyrolysis and hydroconversion processes, deactivating the catalysts and reducing the overall efficiency of such a process. Hydrogen sulfide ($H_2S$) sorbents, such as zinc oxide-based sorbents may also be negatively affected by the presence of chlorides in a reaction system.

The presence of chlorides in the process gas is a commonly encountered problem in a number of industries. The strategies used for mitigation of the effects of chloride in the process stream often rely on the use of a chloride trap used as a sorbent in the form of pellets for a fixed bed reactor, or granules for a fluidized bed reactor. The use of calcium and sodium-based sorbents to capture chlorine in the pyrolysis of municipal waste is described in Fontana, A., et al., 1999, Erdöl-Erdgas-Kohle, Nr 2001, p 117.

Another challenge in processing certain types of material such as waste paper and packaging waste by hydropyrolysis in a fluidised bed reactor is the poor flow properties of these materials. This may be attributed to the high aspect ratio of paper and cardboard, that is, the very high ratio of the lateral dimension of a piece of shredded paper or cardboard to the thickness of paper or cardboard. The flat and elongated pieces obtained by shredding paper or cardboard are found to stack on top of each other, and flow poorly or don't flow at all, when dosing is attempted using a screw dosing system. Sorted municipal solid waste comprising of waste paper, cardboard and plastics that is simply shredded is also 'fluffy' and has a low-density, causing further transportation and processing issues. The present inventors have found, therefore, that densification of the feedstock and processing to improve the aspect ratio of the feedstock is a necessary step for conversion of certain municipal solid waste in a catalytic hydropyrolysis reactor.

It would be advantageous to develop an effective process to convert chloride-containing biomass, particularly waste products such as waste paper, plastics and cardboard, into useful liquid hydrocarbon materials while mitigating the problems, such as corrosion and catalyst poisoning, associated with chlorides present in such biomass. Overcoming handling and dosing issues associated with certain biomass sources would also be advantageous.

SUMMARY OF THE INVENTION

Accordingly, the present invention provides a process for producing liquid hydrocarbon products from a feedstock comprising at least one of a solid biomass-containing feedstock and a solid biomass-derived feedstock and in the range of from 50 to 15,000 ppmw of chlorides, said process comprising the steps of:

a) incorporating a chloride trap material into said feedstock to provide a combined feedstock/chloride trap material;
b) densifying the combined feedstock/chloride trap material to form densified feed in the form of pellets or briquettes;
c) contacting said densified feed with a hydropyrolysis catalyst composition and molecular hydrogen in a hydropyrolysis reactor vessel at a temperature in the range of from 350 to 600° C. and a pressure in the range of from 0.50 to 7.50 MPa to produce a product stream comprising a deoxygenated hydrocarbon product, $H_2O$, $H_2$, $CO_2$, CO, $C_1$-$C_3$ gases, char and catalyst fines; and
d) removing all or a portion of said char and catalyst fines from said product stream.

DETAILED DESCRIPTION OF THE INVENTION

The present inventors have surprisingly found that problems associated with both the presence of chlorides in biomass and handling and dosing of certain biomass sources such as waste paper, plastics and cardboard can conveniently be mitigated by densifying the biomass in a process that also incorporates chloride trap material into the biomass pellets.

The feedstock in the process of the present invention comprises at least one of a biomass-containing feedstock and a biomass-derived feedstock and contains in the range of from 50 to 15,000 ppmw of chlorides.

Biomass Feedstock

The feedstock used in the inventive process comprises any combination of biomass-containing and/or biomass-derived feedstock that comprises in the range of from 50 to 15,000 ppmw of chlorides.

The amount of chlorides contained in the feedstock is measured as the mass of chlorine atoms present in the feedstock in relation to the total mass of the feedstock. The chloride content is expressed on a moisture and ash-free basis. Any methods suitable for the measurement of total chlorine content of the feedstock can be used, for example, EN15289 method for the Measurement of Total Sulfur and Chlorine in Solid Biofuels, or ASTM D4208 Standard Test Method for Total Chlorine in Coal by the Oxygen Bomb Combustion/Ion Selective Electrode Method, or a variation of these methods.

The methods for chlorine measurement generally involve displacement of chlorine in the solid feedstock into a liquid medium, followed by measurement of the chlorine in the liquid medium using a suitable technique. For example, oxygen combustion in a closed oxygen bomb to digest the biomass samples, decomposition in closed vessels or high temperature combustion in a tube furnace may be used for displacing the chlorine from the solid feedstock into a liquid medium. The determination of the resultant chlorine compounds can be done by, for example, ion chromatography, inductively coupled plasma (ICP), potentiometric titration or by using an ion-selective electrode.

The term 'biomass' refers to substances derived from organisms living above the earth's surface or within the earth's oceans, rivers, and/or lakes. Representative biomass can include any plant material, or mixture of plant materials, such as a hardwood or softwood biomass, hardwood or softwood bark, lignin, algae, and/or lemna (sea weeds). Energy crops, or otherwise agricultural residues or other types of plant wastes or plant-derived wastes, may also be used as plant materials. Specific exemplary plant materials include corn fibre, corn stover, castor bean stalks, sugar cane bagasse, sugar cane tops/trash, and sorghum, in addition to 'on-purpose' energy crops such as switchgrass, miscanthus, and algae. Other examples of suitable biomass include organic waste materials, such as waste paper, construction wastes, demolition wastes, and biosludge.

A biomass-containing feedstock may comprise all or substantially all biomass, but may also contain non-biological materials (e.g., materials derived from petroleum, such as plastics, or materials derived from minerals extracted from the earth, such as metals and metal oxides, including glass). An example of a "biomass-containing" feedstock that may comprise one or more non-biological materials is municipal solid waste (MSW).

Such municipal solid waste may comprise any combination of lignocellulosic material (yard trimmings, pressure-treated wood such as fence posts, plywood), discarded paper and cardboard, food waste, textile waste, along with refractories such as glass, metal. Prior to use in the process of this invention, at least a portion of any refractories, such as glass or metal may be removed. Co-processing of MSW with lignocellulosic waste is also envisaged. Certain food waste may be combined with sawdust or other material prior to use in the process of the invention.

Another specific example of a solid biomass-containing feedstock comprises biomass, as described herein, in addition to one or more oxygenated polymers (e.g., plastics). For plastics that contain oxygen in the functional groups of their repeating monomeric substituents, the oxygen is at least partly removed in deoxygenation reactions occurring in the hydropyrolysis and/or hydroconversion reactors of processes described herein. The remainder of the polymeric structure may be used to generate either aliphatic or aromatic hydrocarbons in the substantially fully deoxygenated hydrocarbon product or liquid hydrocarbon fuel.

Of particular relevance to the present invention are plastics incorporating chloride in their structure and, therefore, contributing to the level of chloride present in the feedstock. Representative chloride-containing plastics include polyvinyl chloride (PVC), which may be present as a mixture with other plastics as well as biomass.

The term 'biomass-derived', for example when used in the phrase biomass-derived feedstock, refers to products resulting or obtained from the thermal and/or chemical transformation of biomass, as defined above, or biomass-containing feedstocks.

Any of the types of biomass-containing and biomass-derived feedstocks described herein may be combined and introduced to the process as described herein.

Further, feeds of these biomass-containing and/or biomass-derived feedstocks or other biomass-containing and/or biomass-derived feedstocks may also be introduced separately, for example at differing axial positions into the hydropyrolysis and/or hydroconversion reactor.

Different types of biomass-containing and/or biomass-derived feedstocks may be introduced into either the hydropyrolysis reactor or the hydroconversion reactor, if present.

Preferred biomass-containing and/or biomass-derived feedstocks in the process of the present invention include various municipal solid waste sources. Said municipal solid waste may comprise any combination of lignocellulosic material (yard trimmings, pressure-treated wood such as fence posts, plywood), discarded paper and cardboard, food waste, textile waste, along with refractories such as glass, metal. Prior to use in the process of this invention, removal of at least a portion of any refractories, such as glass or metal is preferably carried out. Certain food waste may be combined with sawdust or other material prior to use in the process of the invention.

Preparation of Densified Feed

Optionally, prior to incorporation of the chloride trap material, the biomass-containing and/or biomass-derived feedstocks may be subjected to one or more pre-treatment processing steps, in order to make said feedstocks suitable for combining with the chloride trap material and densifying. Suitable pre-treatment processing steps include shredding, chipping, milling, grinding, drying.

A chloride trap material is incorporated into the feedstock in order to provide a combined feedstock/chloride trap material.

Suitable chloride trap materials include, but are not limited to, oxides, hydroxides, carbonates and bicarbonates of alkali and alkaline earth metals, for example, $NaHCO_3$, $Na_2CO_3$, $Ca(OH)_2$, CaO, MgO, $CaCO_3$. Naturally occurring minerals containing these components can also be used as chloride traps.

The chloride trap material is incorporated into the biomass-containing and/or biomass-derived feedstocks in order to provide a combined feedstock/chloride trap material.

If the chloride trap material is soluble in water, a solution of the trap material in water or another suitable solvent may be prepared. This solution is then mixed with the, optionally pre-treatment processed, biomass-containing and/or biomass-derived feedstocks. In this embodiment, the concentration of chloride trap is chosen to achieve the desired loading of the trap in the final prepared feedstock.

If the chloride trap is insoluble or not completely soluble in water, a slurry of the chloride trap material in water or another suitable solvent is prepared and mixed with the, optionally pre-treatment processed, biomass-containing and/or biomass-derived feedstock at this step.

The desired final loading of the chloride trap material in the combined feedstock/chloride trap material is dependent on the chloride content of the feedstock. Suitably an amount equivalent to 100% to 600% of the stoichiometric requirement of the chloride trap material is incorporated into the feedstock in the combined feedstock/chloride trap material.

The combined feedstock/chloride trap material is then densified to form densified feed in the form of pellets or briquettes.

Said pellets may be made by any suitable means known in the art for the production of pellets. One preferred method for forming the feed pellets is extrusion of the combined feedstock/chloride trap material through a die.

The feed pellets may be of any suitable extrudate shape, e.g. cylinders, etc. In one embodiment of the invention the pellets are preferably cylindrical in shape.

Pellet particles sizes, for use in a commercial reactor in the hydropyrolysis step are preferably of a nominal diameter in the range of from 3 mm to 50 mm, more preferably in the range of from 6 to 25 mm. Suitable lengths of the pellets are in the range of from 3 mm to 10 cm.

Briquettes may be formed by compression of the combined feedstock/chloride trap material into the desired shape. Typically briquettes may be up to 200 mm in length.

Preferably, prior to being fed to the reactor, the densified feed, in the form of pellets or briquettes, undergoes a further size reduction step, e.g. by grinding. In one embodiment of the invention, after grinding the densified feed, a sieve fraction of less than 4.76 mm is provided to the reactor.

Optionally, binder may be added to the combined feedstock/chloride trap material to improve the strength of the pellets or briquettes.

In a preferred embodiment, after densification of the combined feedstock/chloride trap material, the resultant densified feed in the form of pellets or briquettes may be subjected to a size reduction step before the densified feed is provided to the hydropyrolysis step. This secondary size reduction step may be carried out by any suitable means, e.g. grinding or milling.

Preferably the densified feed fed to the hydropyrolysis reactor, optionally after secondary size reduction, is in the form of material with a longest length no more than 5 mm.

Hydropyrolysis Step

The densified feed is then fed to a hydropyrolysis reactor vessel and contacted with a hydropyrolysis catalyst composition and molecular hydrogen therein.

The hydropyrolysis catalyst composition used in the process of the present invention preferably comprises one or more active metals selected from cobalt, molybdenum, nickel, tungsten, ruthenium, platinum, palladium, iridium and iron. Preferably, the one or more active metals are selected from cobalt, molybdenum, nickel and tungsten.

The metals present in the hydropyrolysis catalyst composition used in the process of the present invention are supported, preferably on an oxide support. Oxides useful as supports for the hydropyrolysis catalyst composition include alumina, silica, titania, ceria, zirconia, as well as binary oxides such as silica-alumina, silica-titania and ceria-zirconia. Preferred supports include alumina, silica and titania. The most preferred support is alumina. The support may optionally contain recycled, regenerated and revitalised fines of spent hydrotreating catalysts (e.g. fines of CoMo on oxidic supports, NiMo on oxidic supports and fines of hydrocracking catalysts containing NiW on a mixture of oxidic carriers and zeolites).

Total metal loadings on the hydropyrolysis catalyst compositions are preferably in the range of from 0.05 wt % to 3 wt % for noble metals (e.g. ruthenium, platinum, palladium and iridium) and from 1 wt % to 75 wt % for base metals (e.g. cobalt, molybdenum, nickel, tungsten and iron) (weight percentages are expressed as a weight percentage of total of all active metals on the calcined catalyst in their reduced (metallic) form).

Additional elements such as one or more of phosphorous, boron and nickel may be incorporated into the catalyst to improve the dispersion of the active metal.

The hydropyrolysis catalyst composition used in the process of the present invention may be prepared by any suitable method known in the art. Suitable methods include, but are not limited to co-precipitation of the active metals and the support from a solution; homogeneous deposition precipitation of the active metals on the support; pore volume impregnation of the support with a solution of the active metals; sequential and multiple pore volume impregnations of the support by a solution of the active metals, with a drying or calcination step carried out between successive pore volume impregnations; co-mulling of the support with a solution or a powder containing the active metals. Further, a combination of two or more of these methods may also be used.

The hydropyrolysis catalyst composition may be provided to the reactor in either an oxidic state, in a sulfided or sulfurised state or in a pre-reduced state.

Therefore, in one embodiment of the invention, after preparation by one of the above or another method, the compositions thus-formed are suitably calcined in the presence of air or oxygen in order to obtain the oxidic state. By the term 'oxidic state' as used herein is meant that 95% or more of the active metal atoms present are present in an oxidation state greater than zero as oxides. For example, a supported oxidic cobalt catalyst has more than 95% of the cobalt present in the +2 or +3 oxidation state, as oxides, and a supported oxidic nickel catalyst has more than 95% of the nickel present in the +2 oxidation state, as oxide.

In another embodiment of the invention, after preparation by one of the above or another method, the compositions thus-formed are suitably subjected to a reduction step in order to convert at least a portion of the active metals into their fully reduced state. This can be carried out by subjecting the catalyst to a reducing gas (for example, gas containing hydrogen) at elevated temperatures and elevated pressures. The temperatures of the reduction step can vary from 120° C. to 450° C. and pressures can vary from 0.1 megapascal to 10 megapascal.

In a further embodiment of the invention, after preparation by one of the above or another method, the compositions thus-formed are suitably subjected to a sulfidation step in order to convert at least a portion of the active metals into their sulfided form. This can be carried out by subjecting the catalyst to a sulfur-containing fluid at elevated temperatures and pressures.

Typical sulfur containing fluids include liquid hydrocarbons containing sulfur dopants or sulfur compounds occurring naturally in the hydrocarbons, and gaseous streams containing hydrogen sulfide. In this embodiment of the invention, the one or more active metals are preferably selected from cobalt, molybdenum, nickel, iron and tungsten. Typical pressures for sulfidation step range from 0.5 MPa to 10 MPa, while typical temperatures range from 150° C. to 450° C. Alternatively, the catalysts may be sulfurised, such that sulfur species are present on the catalyst, which sulfur species will react with the active metal under the conditions in the reactor vessel in order to from the sulfided catalyst.

It will be readily apparent that, although the hydropyrolysis catalyst composition provided in the hydropyrolysis reactor will initially comprise metal or metals in their oxidic, sulfided or reduced states, the chemical form of the catalyst composition will undergo a change under the operating environment of the process, resulting in a change in the chemical form of the active metals on the catalyst and of the support as well. This change will involve phenomena resulting from the interaction of the catalyst with the reactant gas (hydrogen, carbon monoxide, carbon dioxide), products (hydrocarbons) and by-products (water, carbon monoxide, carbon dioxide, ammonia, hydrogen sulfide et cetera) under the temperature and pressure conditions of the process.

It is postulated, without wishing to be bound by theory, that the initial chemical composition will be transformed under the conditions of the process of the invention into a composition where a portion of the active metals may be in reduced form (with an oxidation number of zero), another portion of the active metals may be in a higher oxidation state in sulfided form (forming a chemical bond with sulfur atoms present in the biomass feedstock) and yet another portion of the active metals may be in a higher oxidation state in oxidic form (with oxygen atoms available from the biomass feedstock or from the catalyst itself).

Suitable hydropyrolysis catalyst compositions include those described in WO 2015114008, WO 2016001170, WO2016001134, WO2016001163, US20150094503 and co-pending applications IN4737/CHE/15 and IN201641017931.

Further catalyst may be added to the process as it progresses in order to replace catalyst lost through attrition and carryover. Such catalyst will also be initially provided to the reactor with the active metals being present in their oxidic, sulfided or pre-reduced state.

The hydropyrolysis catalyst composition is preferably present in the form of spherical catalyst particles. Catalyst particles sizes, for use in a commercial reactor in the hydropyrolysis step, are preferably in the range of from 0.3 mm to 4.0 mm, more preferably in the range of from 0.6 mm to 3.0 mm, and most preferably in the range of from 1 mm to 2.4 mm.

Although any type of reactor suitable for hydropyrolysis may be employed, the preferred type of reactor is a bubbling fluidised bed reactor. The fluidisation velocity, catalyst size and bulk density and feedstock size and bulk density are chosen such that the catalyst remains in the bubbling fluidised bed, while the char produced gets entrained out of the reactor.

The hydropyrolysis is suitably carried out in the hydropyrolysis reactor vessel at a temperature in the range of from 350° C. to 600° C. and a pressure in the range of from 0.50 MPa to 7.50 MPa. The heating rate of the biomass is preferably greater than about 100 W/m$^2$.

Char Removal, Cooling and Other Process Steps

Char and catalyst fines are removed from the product stream of the hydropyrolysis step. Any ash present will normally also be removed at this stage. The most preferred method of char and catalyst fines removal from the vapour stream is by cyclone separation. Solids separation equipment (e.g. cyclones) may also be used inside the hydroprocessing reactor (above a dense bed phase) to prevent the entrainment of solid particles above a certain particle size.

Char may also be removed in accordance with the process of this invention by filtration from the vapour stream, or by way of filtering from a wash step—ebullated bed. Backpulsing may be employed in removing char from filters, as long as the hydrogen used in the process of this invention sufficiently reduces the reactivity of the pyrolysis vapours and renders the char produced free-flowing. Electrostatic precipitation, inertial separation, magnetic separation, or a combination of these technologies may also be used to remove char and catalyst fines from the hot vapour stream before further hydrofinishing, cooling and condensation of the liquid product.

In accordance with one embodiment of this invention, cyclone separation followed by hot gas filtration to remove fines not removed in the cyclones may be used to remove the char. In this case, because the hydrogen has stabilised the free radicals and saturated the olefins, the dust cake caught on the filters is more easily cleaned than char removed in the hot filtration of the aerosols produced in conventional fast pyrolysis. In accordance with another embodiment of this invention, the char and catalyst fines are removed by bubbling first stage product gas through a re-circulating liquid. The re-circulated liquid used is the high boiling point portion of the finished oil from this process and is thus a fully saturated (hydrogenated), stabilised oil having a boiling point typically above 370° C. Char or catalyst fines from the first reaction stage are captured in this liquid. A portion of the liquid may be filtered to remove the fines and a portion may be re-circulated back to the first stage hydropyrolysis reactor. One advantage of using a re-circulating liquid is that it provides a way to lower the temperature of the char-laden process vapours from the first reaction stage to the temperature desired for the optional second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, cyclone separation followed by trapping the char and catalyst fines in a high-porosity solid adsorbent bed is used to remove the char and catalyst fines from the vapour stream. Examples of high-porosity solid adsorbents suitable for trapping char and catalyst fines include CatTrap® materials available from Crystaphase. Inert graded bed materials may also be used to remove the char and catalyst fines from the vapour stream.

In accordance with another embodiment of this invention, large-size NiMo or CoMo catalysts, deployed in an ebullated bed, are used for char removal to provide further deoxygenation simultaneous with the removal of fine particulates. Particles of this catalyst should be large, preferably in the range of from 15 to 30 mm in size, thereby rendering them easily separable from the fine char carried over from the first reaction stage, which is typically less than 200 mesh (smaller than 70 micrometres).

Any ash and catalyst fines present may also be removed in the char removal step.

According to some embodiments of the present invention, only the hydropyrolysis and char/catalyst removal steps are practiced, in order to produce the partially deoxygenated hydropyrolysis product (e.g., as a condensed liquid), which, despite being "partially" deoxygenated, may nonetheless be deoxygenated to an extent sufficient for its use as a transportation fuel or a blending component of a transportation fuel. According to other embodiments, the partially deoxygenated hydropyrolysis product, by virtue of its high stability, for example being superior to conventional bio-oils, may be stored for an extended period (e.g., at least about 1 day or at least about 30 days) and/or may be transported to a remote location (e.g., transported at least about 5 miles or transported at least about 50 miles) for further processing, including being subjected to a hydroconversion step as described herein. Alternatively, partially deoxygenated hydropyrolysis product may be stored and/or transported as described above, for the purpose of further processing in a conventional refining process, such as hydrotreating, optionally in combination with a petroleum-derived fraction (e.g., a fraction comprising diesel boiling-range hydrocarbons derived from petroleum).

Optional Hydroconversion Step

After removal of the char and cooling, the partially deoxygenated hydrocarbon product together with the $H_2$, CO, $CO_2$, $H_2O$, and $C_1$-$C_3$ gases from the hydropyrolysis step are optionally contacted with one or more catalyst compositions in a hydroconversion reactor. Said one or more catalyst compositions comprise catalysts suitable for hydrodeoxygenation and aromatic saturation. This step is suitably carried out at a temperature in the range of from 150° C. to 400° C. and a pressure in the range of from 0.50 MPa to 7.50 MPa.

The hydroconversion reactor may comprise one or more reactor vessels and/or one or more reaction zones within a reactor vessel. Each reactor vessel and/or reaction zone may operate under different reaction conditions, e.g. temperature and pressure. Preferably, the hydroconversion reactor is a single reactor vessel.

The hydroconversion catalyst composition used in this optional step may be protected from Na, K, Ca, P, S, Cl and other elements present in the biomass which may otherwise poison the catalyst, since these metals are predominantly removed from the biomass into char and ash in the hydropyrolysis stage. This catalyst is protected from olefins and free radicals by the upgrading achieved in the first reaction stage step.

Any hydroconversion catalyst composition suitable for use in the temperature range of this process may be employed in the hydroconversion step.

The hydroconversion catalyst composition used in the process of the present invention preferably comprises one or more active metals selected from cobalt, molybdenum, nickel, tungsten, ruthenium, platinum, palladium, iridium and iron. Preferably, the one or more active metals are selected from cobalt, molybdenum, nickel and tungsten.

The metals present in the hydroconversion catalyst composition used in the process of the present invention are supported, preferably on an oxide support. Oxides useful as supports for the hydroconversion catalyst composition include alumina, silica, titania, ceria, zirconia, as well as binary oxides such as silica-alumina, silica-titania and ceria-zirconia. Preferred supports include alumina, silica and titania. The most preferred support is alumina. The support may optionally contain recycled, regenerated and revitalised fines of spent hydrotreating catalysts (e.g. fines of CoMo on oxidic supports, NiMo on oxidic supports and fines of hydrocracking catalysts containing NiW on a mixture of oxidic carriers and zeolites).

Total metal loadings on the hydroconversion catalyst compositions are preferably in the range of from 0.05 wt % to 3 wt % for noble metals (e.g. ruthenium, platinum, palladium and iridium) and from 1 wt % to 75 wt % for base metals (e.g. cobalt, molybdenum, nickel, tungsten and iron) (weight percentages are expressed as a weight percentage of total of all active metals on the calcined catalyst in their reduced (metallic) form).

Additional elements such as one or more of phosphorous, boron and nickel may be incorporated into the catalyst to improve the dispersion of the active metal.

The hydroconversion catalyst composition used in the process of the present invention may be prepared by any suitable method known in the art. Suitable methods include, but are not limited to co-precipitation of the active metals and the support from a solution; homogeneous deposition precipitation of the active metals on the support; pore volume impregnation of the support with a solution of the active metals; sequential and multiple pore volume impregnations of the support by a solution of the active metals, with a drying or calcination step carried out between successive pore volume impregnations; co-mulling of the support with a solution or a powder containing the active metals. Further, a combination of two or more of these methods may also be used.

The hydroconversion catalyst composition may be provided to the reactor in either an oxidic state, in a sulfided or sulfurised state or in a pre-reduced state.

In one embodiment of the invention, the hydroconversion catalyst composition comprises the same catalyst composition as used as the hydropyrolysis catalyst composition.

Other suitable catalysts for use as the hydroconversion catalyst composition include those described in WO 2015114008, WO 2016001170, WO2016001134, WO2016001163, US20150094503 and co-pending applications IN4737/CHE/15 and IN201641017931.

Catalyst particles sizes, for use in a commercial reactor in the hydroconversion step, are preferably in the range of from 0.3 mm to 4.0 mm, more preferably in the range of from 0.6 mm to 3.0 mm. Preferably, the hydroconversion catalyst is used in an extruded form, for example cylindrical or as trilobes.

The hydroconversion reactor is preferably a fixed bed reactor operating in either a down-flow or up-flow, preferably down-flow, mode of operation. Depending on the physical state of the feed to this reactor, it may operate under a trickle flow or a gas flow regime.

After the hydroconversion step, the vapour phase product of step d) may be condensed to provide a liquid phase product comprising substantially fully deoxygenated C4+ hydrocarbon liquid and aqueous material. The remaining vapour phase suitably comprises mainly $H_2$, CO, $CO_2$ and light hydrocarbon gases (typically $C_1$ to $C_3$, but this stream may also contain some $C_{4+}$ hydrocarbons) and may be separated.

This remaining vapour phase may optionally be sent to a gas clean-up system to remove $H_2S$, ammonia and trace amounts of organic sulfur-containing compounds, if present as by-products of the process. The stream containing CO, $CO_2$, $H_2$ and light hydrocarbons may then be sent to a separation, reforming and water-gas shift section of the process, wherein hydrogen is produced from the light gases and may be re-used in the process. Preferably, this process provides enough hydrogen for use in the entire process of the invention. Renewable $CO_2$ is discharged as a by-product of the process.

The liquid phase product is then separated in order to remove the aqueous material, suitably by phase separation, and to provide the hydrocarbon product in the form of a deoxygenated hydrocarbon liquid.

The liquid deoxygenated hydrocarbon product herein preferably comprises no more than 5 wt %, more preferably no more than 1 wt % of the oxygen present in the original biomass-containing and/or biomass-derived feedstock. The liquid deoxygenated hydrocarbon product contains less than 2 wt %, preferably less than 1 wt %, and most preferably less than 0.1 wt % oxygen.

Suitably, the liquid deoxygenated hydrocarbon product is then subjected to further separation and purification steps in order to provide desirable products.

In one embodiment of the invention, the liquid deoxygenated hydrocarbon product is subjected to distillation in order to separate the liquid deoxygenated hydrocarbon product into $C_{4+}$ fractions according to ranges of the boiling points of the liquid products contained therein.

The liquid deoxygenated hydrocarbon product comprises naphtha range hydrocarbons, middle distillate range hydrocarbons and vacuum gasoil (VGO) range hydrocarbons, which can be separated by distillation. For the purpose of clarity, middle distillates here are defined as hydrocarbons or oxygenated hydrocarbons recovered by distillation between an atmospheric-equivalent initial boiling point (IBP) and a final boiling point (FBP) measured according to standard ASTM distillation methods. ASTM D86 initial boiling point of middle distillates may vary from 150° C. to 220° C. Final boiling point of middle distillates, according to ASTM D86 distillation, may vary from 350° C. to 380° C. Naphtha is defined as hydrocarbons or oxygenated hydrocarbons having four or more carbon atoms and having an atmospheric-equivalent final boiling point that is greater than 90° C. but less than 200° C. A small amount of hydrocarbons produced in the process (typically less than 10 wt % of total C4+ hydrocarbons, preferably less than 3 wt % of total C4+ hydrocarbons and most preferably less than 1 wt % of total C4+ hydrocarbons) boil at temperatures higher than those for the middle distillates as defined above, i.e. they are hydrocarbons with boiling range similar to vacuum-gas oil produced by distillation of petroleum.

Gasoline is an automotive fuel comprising predominantly of naphtha-range hydrocarbons, used in spark-ignition internal combustion engines. In the United States, ASTM D4814 standard establishes the requirements of gasoline for ground vehicles with spark-ignition internal combustion engines.

Diesel is an automotive fuel comprising predominantly of middle-distillate range hydrocarbons, used in compression-ignition internal combustion engines. In the United States, ASTM D975 standard covers the requirements of several grades of diesel fuel suitable for various types of diesel engines.

An advantage of the present invention is that under suitable operating conditions, the liquid deoxygenated hydrocarbon product produced from the biomass-containing and/or biomass-derived feedstock, may be substantially fully free from oxygen, sulfur and nitrogen and have low content of aromatic compounds. Preferably, the oxygen content of this product is less than 1.50 wt % and more preferably less than 0.50 wt %, and most preferably less than 0.10 wt %. The sulfur content is preferably less than 100 ppmw, more preferably less than 10 ppmw, and most preferably less than 5 ppmw. The nitrogen content is preferably less than 1000 ppmw, more preferably to less than 100 ppmw and most preferably to less than 10 ppmw. The aromatics content is preferably less than 10 wt %, more preferably less than 7 wt %, even more preferably less than 5 wt %.

In the process of the present invention, chloride-containing biomass-containing and/or biomass-derived feedstock is effectively converted to useful hydrocarbon liquids using a chloride trap material incorporated into feed pellets containing the feedstock. Since the chloride trap is incorporated in the feedstock itself, the contact between chloride trap and the chloride bearing species liberated from the solid feedstock (mostly, hydrogen chloride) is intimate, resulting in removal of chloride from the gas phase. Such intimate contact between the chloride trap and the chloride bearing molecules liberated from the feedstock will help in minimizing the exposure of the hydropyrolysis catalyst composition itself to the chloride bearing molecule, as such molecules are likely to be trapped before they come in contact with the catalyst.

Further, the chloride trap material remains in the produced char, and is effectively removed from the reactor during the removal of char using known char removal techniques, for example, cyclone separation or hot gas filtration. Thus, the accumulation of chloride trap in the reactor is prevented.

A further advantage of the present invention is that using chloride trap material that is integral to the feedstock also has the benefit of allowing for maximizing the catalyst composition inventory in the reactor, as the total amount of inorganic solids (hydrodeoxygenation catalyst, and any other additives/sorbents used in the hydropyrolysis reactor) is limited by the volume of the reactor.

Furthermore, since the chloride content of the feedstock may vary depending on the composition of the feedstock, this method allows for changing the amount of chloride trap material added based on the actual chloride content of the feedstock. Since chloride trap material is may not be recovered and reused in this method, this allows minimisation of the amount used and prevents waste.

DETAILED DESCRIPTION OF THE DRAWINGS

Figure 1:
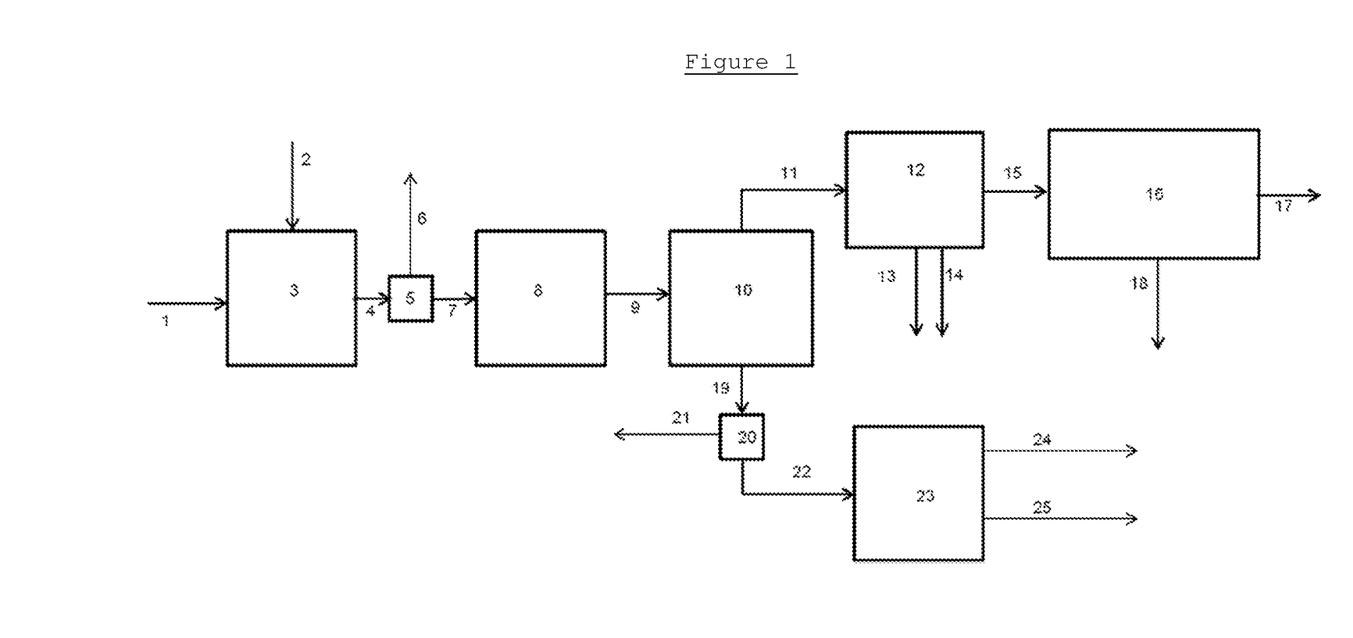
FIGS. 1 and 2 show representations of embodiments of the process of the invention.

In FIG. 1, biomass-containing and/or biomass-derived feedstock in the form of feed pellets also containing chloride trap material 1 is contacted with a hydrogen-containing gaseous stream 2 in the presence of a hydropyrolysis catalyst composition in hydropyrolysis reactor vessel 3. The product 4 of this reactor is a mixed solid and vapour phase product containing hydrogen, light gases ($C_1$-$C_3$ hydrocarbons, CO, $CO_2$, $H_2S$, ammonia, water vapour), vapours of C4+ hydrocarbons and oxygenated hydrocarbons. Char, ash and catalyst fines are entrained with the vapour phase product. A solid separator 5 separates char, ash and catalyst fines 6 from the vapour phase product 7. The vapour phase product 7 then enters the catalytic hydroconversion reactor vessel 8. This reactor vessel is suitably a fixed bed reactor. The product 9 from this reactor vessel contains light gaseous hydrocarbons (methane, ethane, ethylene, propane, and propylene), naphtha range hydrocarbons, middle-distillate range hydrocarbons, hydrocarbons boiling above 370° C. (based on ASTM D86), hydrogen and by-products of the upgrading reaction such as $H_2O$, $H_2S$, $NH_3$, CO and $CO_2$. The vapours are condensed in one or more condensers followed by gas-liquid separators 10 downstream of the catalytic hydroconversion reactor 8 and a liquid product 19 is recovered.

Additionally, gas-liquid absorption in a packed bed or in a bubble column may be employed in section 10 to maximize the recovery in liquid form of hydrocarbons (predominantly C4-C5) in the gas phase. The lean oil used in the absorber may comprise middle-distillate range hydrocarbons and vacuum gasoil range hydrocarbons produced in the distillation section 23.

The non-condensable gases 11 are sent to a gas clean-up system 12, comprising one or more process units, to remove an $H_2S$ stream 13 and ammonia stream 14 as by-products of the process. Organic sulfur containing compounds may be removed in the gas clean-up system as well. The stream containing light hydrocarbons 15 is sent to a separation, reforming and water-gas shift section 16 of the process, where hydrogen 17 is produced from the light gases and renewable $CO_2$ is discharged as a by-product of the process 18. A fuel gas stream may be recovered as a by-product from this section as well.

The liquid product 19 recovered from the condensation and gas-liquid separation system 10 is sent to a product recovery section 20, where the aqueous product 21 is separated from the hydrocarbon liquid product 22. The hydrocarbon liquid product is then sent for distillation 23 to recover gasoline product 24 and a middle-distillate product 25. If desired, kerosene/jet fuel and diesel may be recovered as separate streams from the distillation tower.

Figure 2:
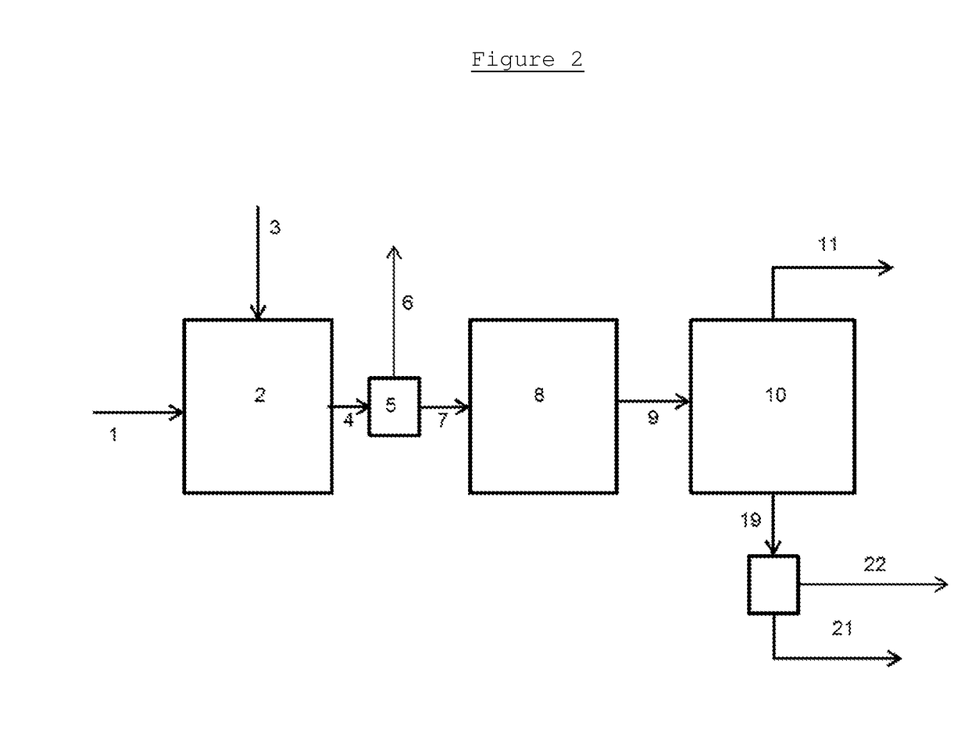

FIG. 2 illustrates the experimental set up used for the examples. The features of FIG. 2 are the same as those with the same numbers in FIG. 1.

Figure 3:
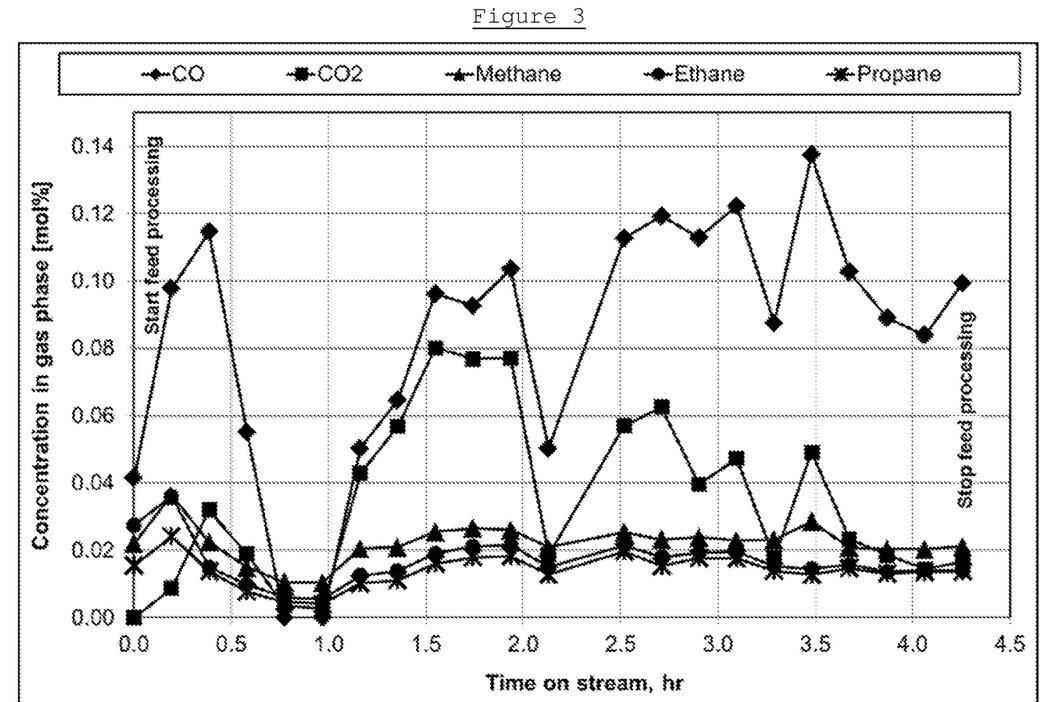
FIGS. 3, 4 and 5 show the results of the Examples contained herein.
Figure 4:
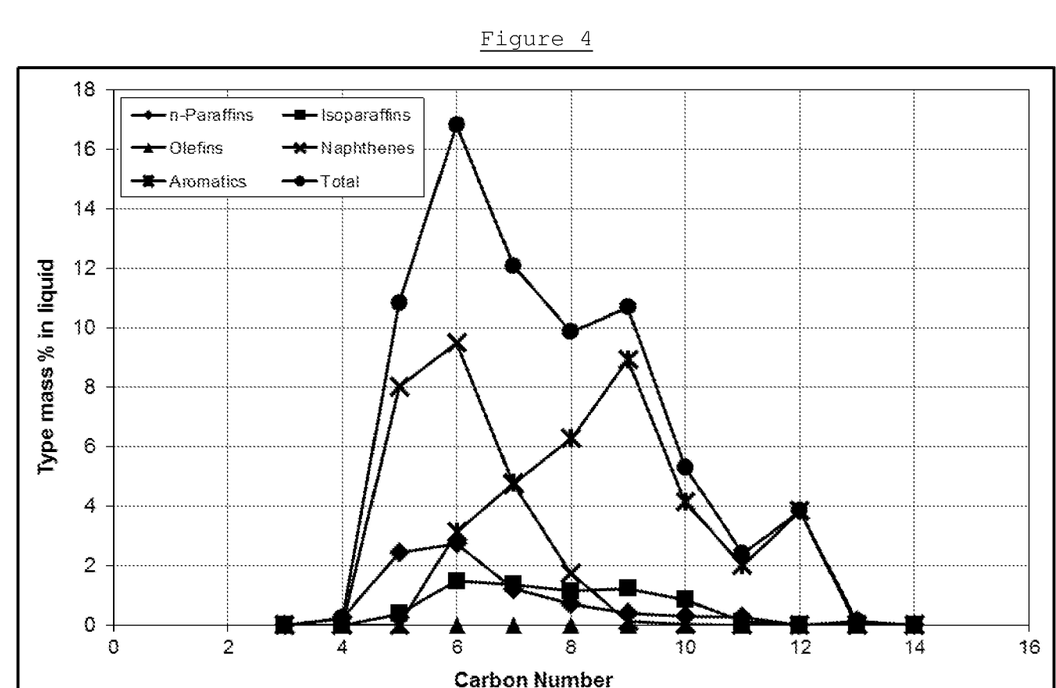
Figure 5:
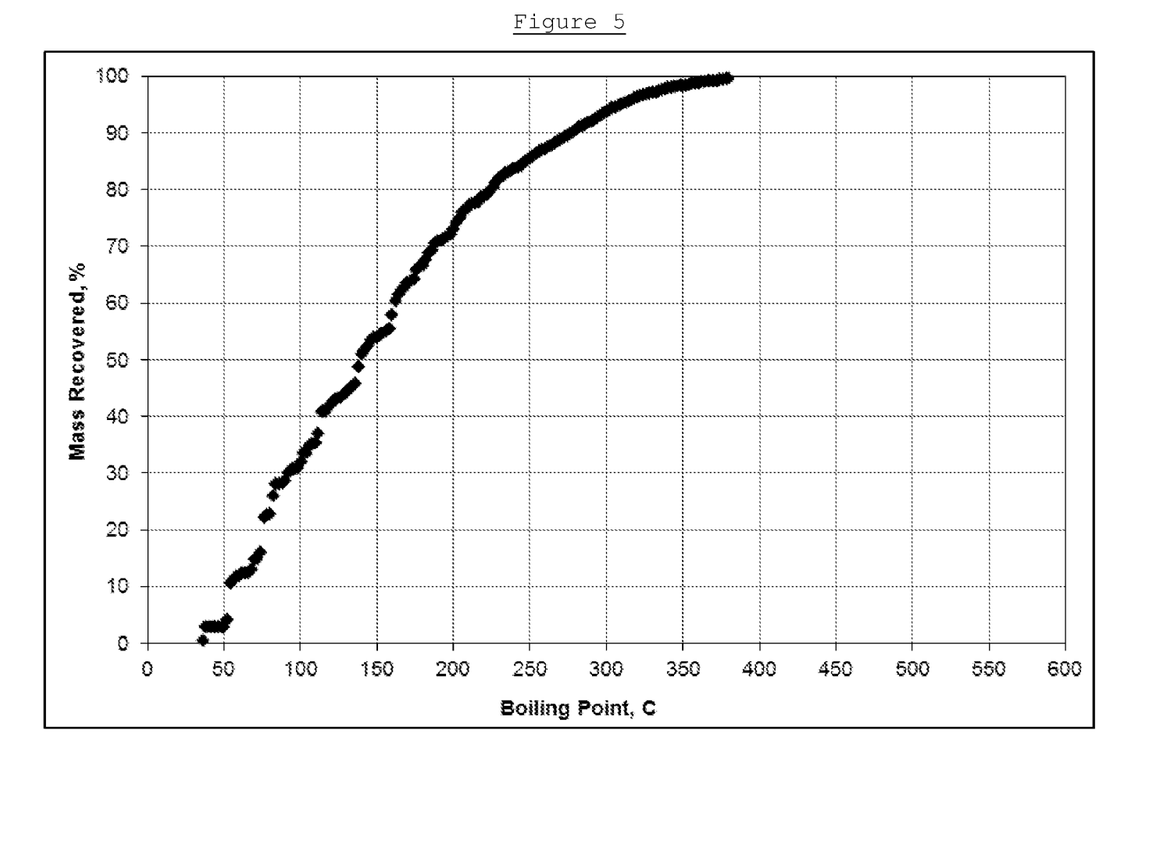

FIGS. 3, 4 and 5 show the results of the examples described below.

The invention will now be illustrated by means of the following Examples, which are not intended to limit the invention.

EXAMPLE 1

Comparative

S-4211 catalyst (a cobalt/molybdenum catalyst commercially available from CRI Catalyst Company) was crushed and sieved to a particle size range of 300 μm to 500 μm. The catalyst was subjected to a sulfidation procedure to convert the cobalt and molybdenum metals to their sulfide forms. About 200 g of this catalyst was used as the upgrading catalyst in the first, bubbling fluidized bed, hydropyrolysis reactor.

S-4221 catalyst (a nickel/molybdenum catalyst commercially available from CRI Catalyst Company) was subjected to a sulfidation step to convert the nickel and molybdenum metals to their sulfide forms. In the second, fixed bed reactor, about 705 g of sulfided S-4221 catalyst was loaded in the form of extrudates of nominally 1.3 mm diameter and approximately 3 mm to 6 mm length.

The solid feedstock used was shredded printing paper sized to an average size of about 3 mm. The feedstock used was in the shape of discs with thickness equal to the thickness of the paper, and a diameter equal to approximately 3 mm. The catalyst in the first, bubbling fluidized reactor was fluidized with a stream of hydrogen pre-heated to a temperature of approximately 435° C. After the first stage catalyst had been fluidized, the shredded paper feedstock was introduced into the reactor using a double-screw dosing system. The double screw dosing system comprised of a slow, metering screw delivering the feedstock to a fast screw. The fast screw pushes the feedstock into the reactor with minimal residence time in the screw housing itself, to minimize non-catalytic undesirable slow pyrolysis reactions in the screw housing.

During the run, an attempt was made to increase the flow rate of the feedstock entering the reactor to about 340 g/hr, which corresponds to a weight-hourly space velocity of 1.7 g feedstock/(g catalyst.hr). However, it was noticed during the run that the dosing of the feedstock into the reactor was quite unsteady, as indicated by fluctuations of the light gas concentrations evolving during the run (FIG. 3) and by the fluctuations in the temperature inside the reactor. Since the hydrodeoxygenation reactions taking place in the hydropyrolysis reactor are highly exothermic, the temperature fluctuations are attributed to unsteady dosing of feedstock into the reactor. It was also noticed that the target feed rate could not be achieved, and only about 50 g feedstock was processed per hour on average over the duration of the run.

The feedstock that was processed was converted to a mixture of char, ash and vapours in the first, hydropyrolysis stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well. The solid product was separated from the vapour phase product in a hot filtration set-up and the vapours were sent to the second stage fixed bed reactor. Operating pressure for both the first and the second stages was approximately 2.24 MPa (gauge).

The vapour phase product of the second stage was cooled in stages using a cooling medium maintained at about −55° C. and a two-layer liquid product containing a hydrocarbon layer floating on an aqueous layer was recovered. The aqueous liquid was separated from the hydrocarbon liquid, and was analysed. The off-gas from the process was sent to an online gas chromatogram, and the composition of the gas was analysed throughout the run. Due to the rather small quantity of the feedstock processed, also due to the unsteady nature of feedstock dosing, mass balance could not be closed with desired degree of accuracy in this Experiment.

It was found that the aqueous liquid product had a very low pH (below pH 0). Since chlorine-based compounds are used to produce bleached, white printing-paper, it was suspected that the low pH was a result of chlorine from the feedstock evolving as HCl, and dissolving in the aqueous liquid. This was confirmed by measurement of elemental chlorine in the aqueous phase. The aqueous phase was found to have about 16.3 wt % chlorine. This chlorine content corresponds to a 5 M hydrochloric acid.

EXAMPLE 2

Inventive

Preparation of Printing Paper by Pelletisation

About 30 kg of printing paper was shredded to a size of approximately 5-20 mm. Sodium bicarbonate ($NaHCO_3$) was used as the chloride trap. About 25 kg of water purified by reverse osmosis was heated to a temperature of approximately 60° C., and to this pre-heated water, about 0.95 kg of sodium bicarbonate was added. The mixture was stirred until sodium bicarbonate was dissolved in water. The temperature was maintained at about 60° C. The solution of chloride trap was then mixed uniformly with the shredded printing paper. The wet printing paper, containing the chloride trap, was extruded through a 6 mm die, producing cylindrical pellets. The pellets held together well even without any binder. The loading of sodium bicarbonate on the final feedstock was about 3.2 wt %.

The pellets were then dried to a moisture content of approximately 10 wt %, and were crushed using a cutting mill. The granules obtained by crushing the pelletized paper were free-flowing. They were sieved and the sieve fraction of 710 μm to 1 mm was used for processing to hydrocarbons using the $IH^2$ process.

Co-Processing of Pelletized Printing Paper with Jatropha Sawdust

Considering the observation of highly acidic aqueous phase produced when 100% printing paper was processed (Example 1), and the potential of attack of the highly acidic, chloride-containing aqueous product on the walls of product coolers and gas-liquid separators, it was decided to co-process the pelletized printing paper containing chloride trap with a woody biomass to minimize the potential for corrosion. The granules derived from pelletized printing paper (710 μm to 1 mm sieve fraction) were mixed with crushed and sieved Jatropha sawdust (0 to 500 μm sieve fraction) in a mass ratio of 20:80, and the mixed feedstock was processed. The two feedstocks were physically mixed with each other to obtain a uniform mixture before processing.

It should be noted that the efficacy of the chloride trap added to the printing paper can be assessed for the mixed feedstock by measuring the pH of the aqueous phase produced. When woody biomass such as Jatropha alone is processed, the pH of the aqueous phase produced is about 9. Considering the pH of <0 (approximately 5 M hydrochloric acid) of the aqueous produced from printing paper alone in Example-1, with 20 wt % co-processing, in the absence of a chloride trap, the acid strength is high enough to neutralize the basic pH of aqueous phase typically seen with woody biomass, and render the aqueous phase strongly acidic.

S-4261 catalyst (a cobalt/molybdenum catalyst commercially available from CRI Catalyst Company) was crushed and sieved to a particle size range of 300 μm to 500 μm. 200 g of this catalyst was used as the upgrading catalyst in the first, bubbling fluidized bed, hydropyrolysis reactor. In the second, fixed bed reactor, about 750 g of S-4232 catalyst (a cobalt/molybdenum catalyst commercially available from CRI Catalyst Co). was loaded in the form of extrudates of nominally 1.3 mm diameter and approximately 3 mm to 6 mm length.

The catalyst in the first, bubbling fluidized reactor was fluidized with a stream of hydrogen pre-heated to a temperature of approximately 435° C. After the first stage catalyst had been fluidized, the combined feedstock was introduced into the reactor and processed in a continuous manner. The rate of processing of biomass was approximately 4.59 g/min on moisture and ash-free basis during the experiment. This feed rate corresponds to a weight hourly space velocity of approximately 1.19 kg biomass fed per kg catalyst per hour (on a moisture and ash-free basis). Over the duration of biomass processing, the weighted average temperature of the fluidized bed of catalyst was 441.3° C. The combined feedstock was converted to a mixture of char, ash and vapours in the first, hydropyrolysis stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well.

The solid product was separated from the vapour phase product in a hot filtration set-up and the vapours were sent to the second stage fixed bed reactor. The average temperature of the second stage catalyst during the experiment was maintained at 410.9° C. The average weight hourly space velocity for the second stage was 0.32 kg biomass fed per kg catalyst per hour (on a moisture and ash-free basis). Operating pressure for both the first and the second stages was 2.24 MPa (gauge).

The vapour phase product of the second stage was cooled in stages to −42.3° C. and a two-layer liquid product containing a hydrocarbon layer floating on an aqueous layer was recovered. The hydrocarbon liquid was separated from the aqueous liquid, and was analysed. The off-gas from the process was sent to an online gas chromatogram, and the composition of the gas was analysed throughout the run. The mass balance and carbon balance of the process was calculated from the mass and analysis of the liquid products and compositional information of the gas product, based on which the yield profile was calculated.

It was found that the hydrocarbon liquid product had a very low oxygen content (essentially below the detection limit of the instrument of 0.01 wt %), and the aqueous product produced contained only 0.13 wt % carbon. Thus, complete hydrodeoxygenation of the biomass was achieved producing an oxygen-free hydrocarbon product, and a nearly carbon-free aqueous phase. The total acid number of the hydrocarbon product was found to be very low, less than 0.1 mg KOH/g.

The hydrocarbon and aqueous phases were subjected to further analysis. The detailed hydrocarbon analysis (DHA) of the hydrocarbon product (FIG. 4) showed this product to be comprising predominantly of cyclic species. Among the cyclic species, naphthenes were found to dominate in the low carbon number range (carbon numbers of 7 and lower), while aromatics dominated at higher carbon number range (carbon numbers of 8 and above). Paraffins and isoparaffins were present mainly in the low carbon number molecules (carbon numbers of 7 and lower). 6-carbon molecules were the most abundant molecules in the liquid product.

SIMDIS of the hydrocarbon product (FIG. 5) showed the product to be boiling predominantly in the gasoline and diesel range, with essentially no heavy hydrocarbons (boiling above 370° C.) produced. The yield of C4+ hydrocarbons (hydrocarbons in the product having 4 or more carbon atoms) in this Example was found to be 21.9 wt % of the combined feedstock weight on a moisture and ash-free basis. The yield structure of the other products is mentioned in Table 2.

The aromatic content of the total liquid product (TLP) was also measured using IP-391 analytical method. This method showed the product to contain about 52 wt % aromatics, with the contribution of monoaromatics at 41.7 wt % of the total liquid, that of diaromatics at 8.3 wt % of the total liquid, and that of tri+ aromatics at 2 wt % of the total liquid.

The pH of the aqueous phase produced was measured to be 9.9. Considering this pH is comparable or higher than the pH obtained when woody biomass Jatropha is processed alone, it can be concluded that the release of the chloride in the printing paper to the gas phase in the form of hydrogen chloride, and dissolution of this hydrogen chloride in the aqueous phase to produce hydrochloric acid, has been prevented by the addition of the chloride trap.

TABLE 1

| Feedstock | Example-2 |
|---|---|
| Weight of feedstock processed, g (MAF) | 793.5 |
| Duration of feedstock processing, min | 173.0 |
| Feedstock Analysis | |
| Moisture, wt % | 6.9 |
| Ash, wt % (dry basis) | 7.09 |
| Elemental Analysis (MAF Basis) | |
| Carbon, wt % | 45.6 |
| Hydrogen, wt % | 6.44 |
| Oxygen, wt % | 47.31 |
| Sulfur, wt % | 0.095 |
| Nitrogen, wt % | 0.554 |
| Feedstock H:C Atomic Ratio | 1.68 |

TABLE 2

| products | |
|---|---|
| Yield Details | |
| C4+ Hydrocarbon Yield (wt %, MAF) | 21.9 |
| C1-C3 Hydrocarbon Yield (wt %, MAF) | 17.2 |
| CO Yield (wt %, MAF) | 2.5 |
| CO₂ Yield (wt %, MAF) | 1.0 |
| Char (wt %, MAF) | 14.2 |
| Water Yield (wt %, MAF) | 45.5 |
| Hydrogen added (wt %, MAF) | 5.95 |
| Condensed Hydrocarbon Liquid Analysis | |
| Oxygen Content (wt %) | BDL |
| Carbon Content (wt %) | 88.3 |
| Hydrogen Content (wt %) | 11.9 |
| Density (g/mL, at 15° C.) | 0.8245 |
| Gasoline in C4+ Hydrocarbon (%) | 74 |
| Diesel in C4+ Hydrocarbon (%) | 26 |
| Total Acid Number (TAN) | <0.01 |
| H/C Atomic Ratio | 1.61 |
| C1-C3 Gas Composition | |
| Methane wt % | 40.9 |
| Ethane wt % | 37.2 |
| Propane wt % | 21.9 |

TABLE 2-continued

| products | |
|---|---|
| Water Analysis | |
| pH | 9.9 |
| Density (g/mL, at 15° C.) | 1.0036 |
| Carbon Content (wt %) | 0.13 |

Notes
1. Moisture content is estimated from weight loss of the sample after drying at 103±2° C.
2. Ash content is estimate from the weight loss of the sample after combustion at 575±25° C. and expressed on the basis of the dry weight of the sample.
3. MAF=moisture and ash free basis
4. Gasoline is defined here as containing hydrocarbons having between 4 and 10 carbon atoms.
5. Diesel is defined here as containing hydrocarbons with 11 or more carbon atoms.
6. BDL=Below detection limit. (0.01 wt % for oxygen measurement)

That which is claimed is:

1. A process for producing liquid hydrocarbon products from a feedstock comprising: (i) a solid biomass-containing feedstock, a solid biomass-derived feedstock, or a combination thereof, and (ii) chlorides in the range of from 50 to 15000 ppmw, the process comprising:
   a) incorporating a chloride trap material into the feedstock to provide a combined feedstock/chloride trap material;
   b) densifying the combined feedstock/chloride trap material to form a densified feed in the form of pellets or briquettes;
   c) contacting the densified feed with a hydropyrolysis catalyst composition and molecular hydrogen in a hydropyrolysis reactor vessel at a temperature in the range of from 350 to 600° C. and a pressure in the range of from 0.50 to 7.50MPa to produce a product stream comprising a deoxygenated hydrocarbon product, $H_2O$, $H_2$, $CO_2$, CO, $C_1$—$C_3$ gases, char and catalyst fines; and
   d) removing all or a portion of the char and catalyst fines from the product stream.

2. The process according to claim 1, wherein the densified feed is in the form of material with a longest length no more than 5 mm.

3. The process according to claim 1, wherein the densified feed is subjected to a size reduction step before being provided to the hydropyrolysis reactor vessel.

4. The process according to claim 1, wherein the feedstock comprises municipal solid waste.

5. The process according to claim 1, wherein the feedstock comprises at least one of paper and cardboard.

6. The process according to claim 1, wherein the feedstock comprises a chlorine-containing plastic.

7. The process according to claim 1, wherein the feedstock comprises in the range of from 500 to 8000 ppmw of chlorides.

8. The process according to claim 1, wherein the chloride trap material comprises at least one of oxides, hydroxides, carbonates and bicarbonates of alkali and alkaline earth metals.

9. The process according to claim 8, wherein the chloride trap material comprises at least one of $NaHCO_3$, $Na_2CO_3$, $Ca(OH)_2$, CaO, MgO and $CaCO_3$.

10. The process according to claim 1, wherein after removal of the char and cooling, the deoxygenated hydrocarbon product together with the $H_2$, CO, $CO_2$, $H_2O$, and $C_1$-$C_3$ gases from the hydropyrolysis step are contacted with one or more catalyst compositions in a hydroconversion reactor.

* * * * *